(12) United States Patent
Kirchen et al.

(10) Patent No.: US 8,430,421 B2
(45) Date of Patent: Apr. 30, 2013

(54) FASTENER CLIP

(75) Inventors: James T Kirchen, Glenview, IL (US); Jesse L Jensen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 254 days.

(21) Appl. No.: 13/056,680

(22) PCT Filed: Jul. 1, 2009

(86) PCT No.: PCT/US2009/049397
§ 371 (c)(1),
(2), (4) Date: Jan. 31, 2011

(87) PCT Pub. No.: WO2010/016982
PCT Pub. Date: Feb. 11, 2010

(65) Prior Publication Data
US 2011/0133434 A1    Jun. 9, 2011

Related U.S. Application Data

(63) Continuation-in-part of application No. PCT/US2008/062981, filed on May 8, 2008.

(60) Provisional application No. 61/086,021, filed on Aug. 4, 2008, provisional application No. 60/928,374, filed on May 9, 2007.

(51) Int. Cl.
*B60R 21/20* (2006.01)

(52) U.S. Cl.
USPC .......................... 280/728.2; 411/45; 411/549

(58) Field of Classification Search ............... 280/728.2; 248/231.81; 411/45–48, 549, 508–510, 41, 411/349; 24/453, 602
See application file for complete search history.

(56) References Cited

U.S. PATENT DOCUMENTS

| 4,422,222 A | 12/1983 | Notoya |
| 6,932,552 B2 | 8/2005 | Anscher et al. |
| 6,952,863 B2 | 10/2005 | Draggoo et al. |
| 7,077,449 B2 | 7/2006 | Tokunaga |

(Continued)

FOREIGN PATENT DOCUMENTS

| EP | 1260719 A1 | 11/2002 |
| GB | 2362427 A | 11/2001 |

OTHER PUBLICATIONS

ISR for PCT/US2009/049397 mailed Dec. 4, 2009.

*Primary Examiner* — Faye M. Fleming
(74) *Attorney, Agent, or Firm* — Mark W. Croll; Paul F. Donovan (57) ABSTRACT

A fastener clip includes a body having an opening extending therethrough, a pair of detents formed in an exterior surface of the body, and a rigid retaining pin inserted through the opening, the rigid retaining pin having a pair of flexible fingers configured to engage the pair of detents, the flexible fingers configured to disengage from the pair of detents when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis. An airbag retention system including the fastener clip is also described herein.

14 Claims, 7 Drawing Sheets

U.S. PATENT DOCUMENTS

| | | | |
|---|---|---|---|
| 7,976,056 B2 * | 7/2011 | Kirchen et al. | 280/728.2 |
| 2005/0071959 A1 * | 4/2005 | Minnich et al. | 24/297 |
| 2006/0197317 A1 * | 9/2006 | Watanabe | 280/728.2 |
| 2007/0003390 A1 * | 1/2007 | Kawai | 411/48 |
| 2008/0141052 A1 | 6/2008 | Thelemann et al. | |

* cited by examiner

FASTENER CLIP

CROSS REFERENCE TO RELATED APPLICATIONS

This Non-Provisional Application is national phase of International Application Number PCT/US2009/049397 filed Jul. 1, 2009, which claims benefit to U.S. Provisional Application Ser. No. 61/086,021 filed on Aug. 4, 2008, and is also a continuation-in-part of PCT Application No. PCT/US08/062981 filed on May 8, 2008 which claims benefit to U.S. Provisional Application Ser. No. 60/928,374 filed on May 9, 2007.

BACKGROUND OF THE INVENTION

The present invention relates generally to fasteners, and more particularly to side airbag retention systems and fasteners therefore.

Supplemental restraint systems or airbags have become an important safety feature in today's automobiles. At least one known supplemental restraint system includes a driver's side airbag that is mounted in the steering column and a passenger side airbag that is mounted in the vehicle dashboard. To further increase passenger safety, at least some known vehicles include a side airbag inflatable curtain system (SABIC). The SABIC system is installed within the vehicle using a side airbag retention system.

At least one known side airbag retention system includes a panel member having several openings therethrough. Prior to the airbag being deployed, the panel member covers and protects the side airbag. The panel member is generally attached to the vehicle chassis using a plurality of known fasteners that are inserted through the panel member to secure the panel member to the vehicle chassis. During operation, when the side airbag is deployed, the panel member separates from the vehicle chassis and may become a projectile. To enable the panel member to separate from the chassis and thus allow the airbag to deploy, at least one known fastener includes a tether.

More specifically, the known fastener includes a housing having a hollow interior to receive the tether. The known tether is fabricated using a flexible fiber material. The tether also has a predetermined length that is based on the amount of separation desired between the vehicle chassis and the panel member. For example, assuming the tether has a length of one one-half inch, when the airbag is deployed, the tether will limit the movement between the chassis and the panel member to one-half inch. Since, the size of the opening in the fastener housing is less than the length of the tether, the tether is bent or coiled to fit within the fastener housing.

However, assuming that a customer desires that the panel member be displaced by one inch during deployment, the length of the tether must also be increased. As a result, either the height of the fastener housing must be increased to accept the tether having the increased length or the tether must be more tightly stored within the known fastener housing. Increasing the height of the fastener housing may cause styling issues as the size of the fastener housing becomes undesirable. However, maintaining the size of the known fastener housing results in a tether, having an increased length, being more tightly coiled and then stored in the fastener housing. In either configuration, the known tether is deformed in the stowed position, causing increase stress to the tether that may weaken the tether causing the tether to break when the airbag is deployed. Additionally, increased force may be applied to the fastener housing by the tether in the stowed position causing the fastener housing to separate from the chassis when the airbag is not deployed.

A need remains for a fastener clip that performs the intended function of holding the panel member to the vehicle chassis and while allowing the panel member to separate but not completely detach from the vehicle chassis, while also eliminating the need for a tether to secure the panel member when the airbag is deployed.

BRIEF DESCRIPTION OF THE INVENTION

In one embodiment, a fastener clip adapted to secure a trim piece to a vehicle chassis is provided. The fastener clip includes a body having an opening extending therethrough, a pair of detents formed in an exterior surface of the body, and a rigid retaining pin inserted through the opening, the rigid retaining pin having a pair of flexible fingers configured to engage the pair of detents, the flexible fingers configured to disengage from the pair of detents when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis.

In another embodiment, a side airbag retention system for use in conjunction with a vehicle is provided. The vehicle includes a vehicle chassis, an airbag coupled to the vehicle chassis, and a trim piece adapted to cover the airbag. The airbag retention system also includes a fastener clip adapted to secure a trim piece to a vehicle chassis is provided. The fastener clip includes a body having an opening extending therethrough, a pair of detents formed in an exterior surface of the body, and a rigid retaining pin inserted through the opening, the rigid retaining pin having a pair of flexible fingers configured to engage the pair of detents, the flexible fingers configured to disengage from the pair of detents when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 1:
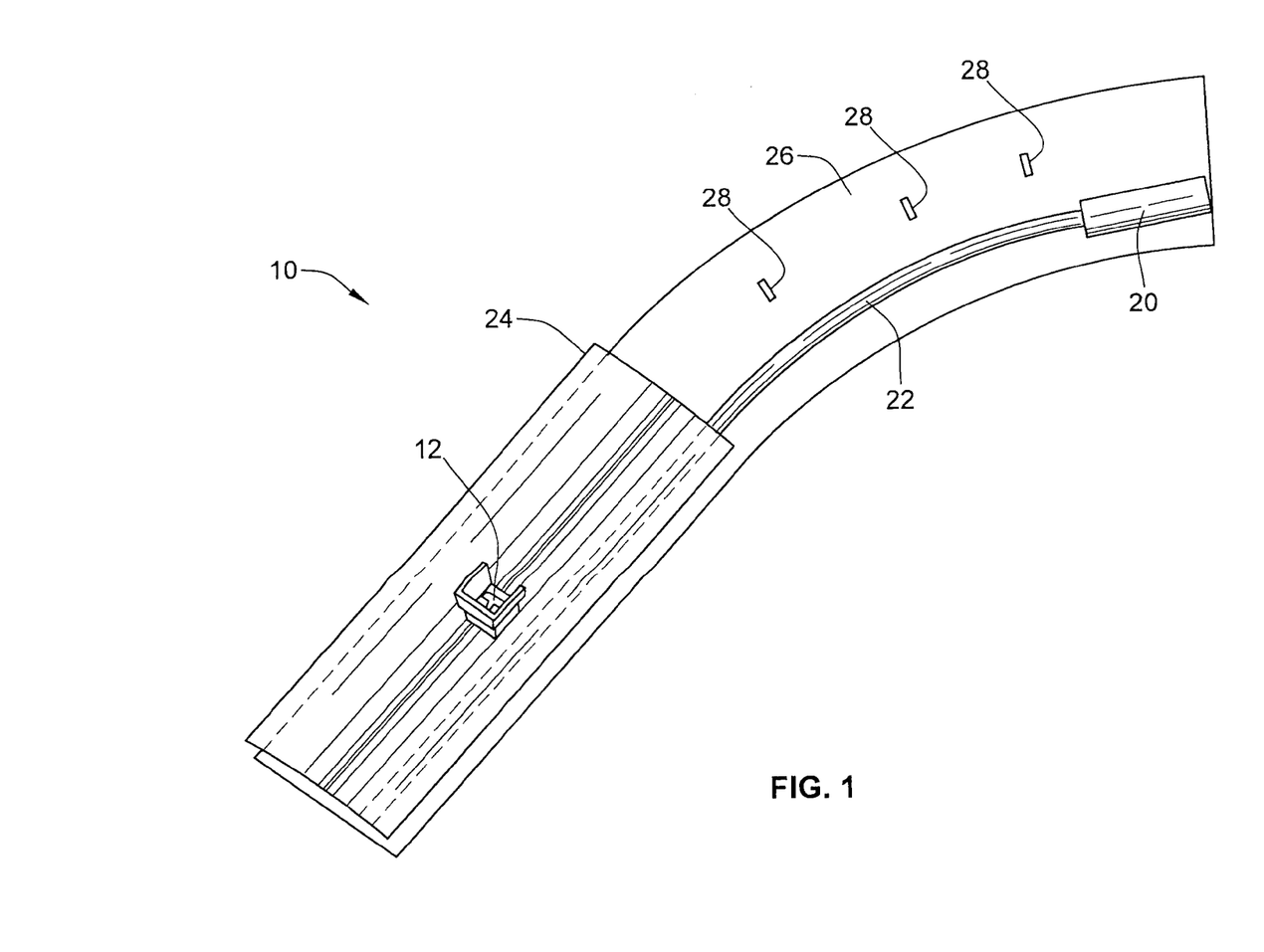
FIG. 1 is a partial cut-away view of an exemplary airbag retention assembly in accordance with an aspect of the present invention.

FIG. 1 is a cut-away view of an exemplary airbag retention assembly 10 that includes a plurality of exemplary fastener clips 12 in accordance with an embodiment of the present invention. Although the fastener clips have been described in connection with an airbag retention system, the fastener clips 12 described herein are capable of use in other applications, and the airbag retention assembly 10 is merely shown and described as an example of one such application.

The airbag retention assembly 10 includes an airbag 20, an airbag tether 22, and a trim piece 24. As shown in FIG. 1, a portion of the trim piece 24 has been removed to illustrate the airbag 20 and the airbag tether 22 installed beneath the trim piece 24. In the exemplary embodiment, the airbag 20 is secured to a vehicle chassis 26 via the airbag tether 22. The airbag retention assembly 10 also includes the plurality of fastener clips 12. In the exemplary embodiment, the vehicle chassis 26 includes a plurality of openings 28 that are each sized to receive a single fastener clip 12 therethrough. In one mode of operation, referred to herein as the airbag stowed mode, the fastener clips 12 restrain the trim piece 24 against the vehicle chassis 26 as shown in FIG. 1. In another mode of operation, the fastener clips 12 enable the trim piece 24 to separate but not completely detach from the vehicle chassis 26, when the airbag is deployed as shown below in FIG. 6B.

Figure 2:
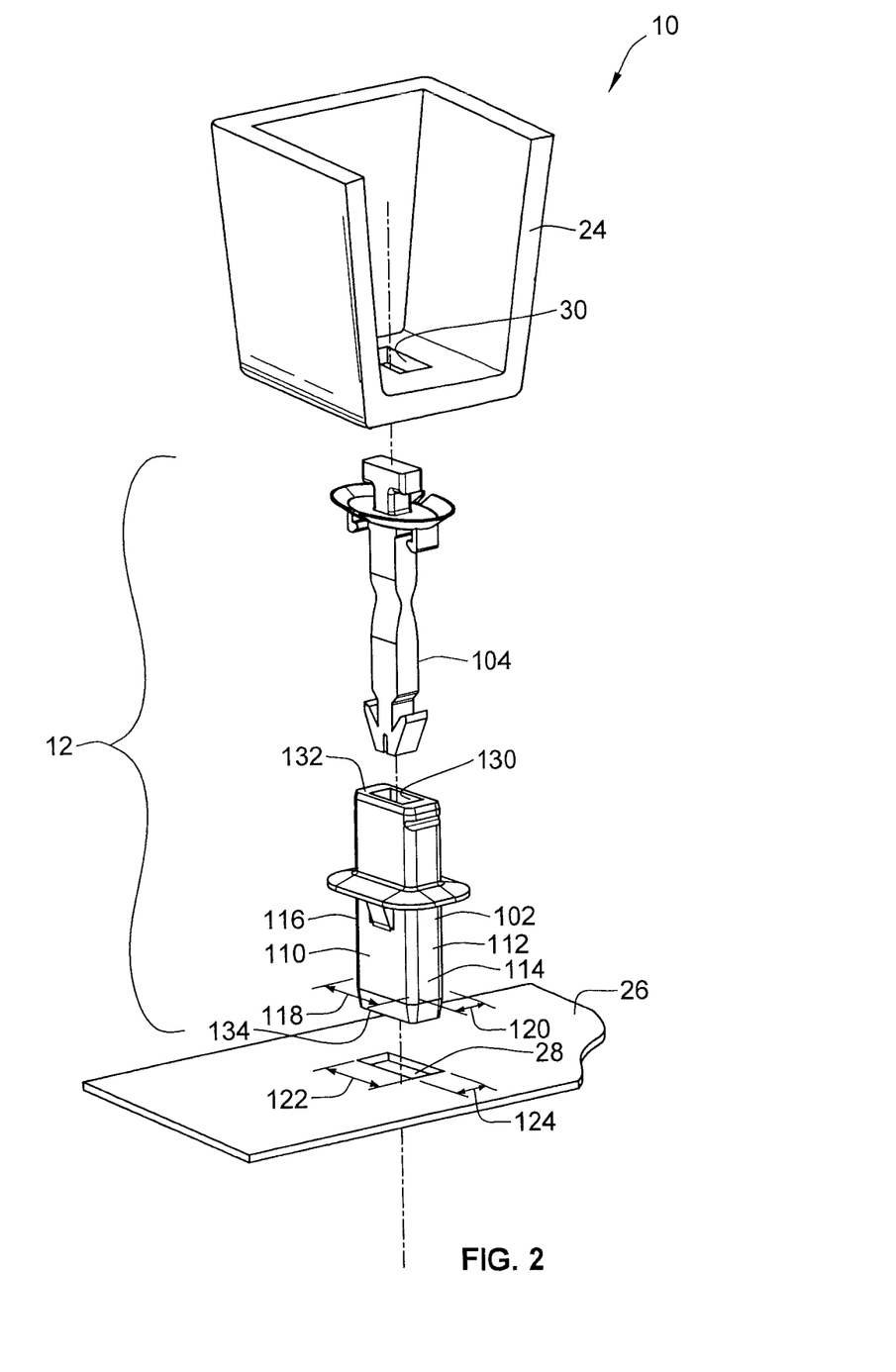
FIG. 2 is an exploded view of the airbag retention assembly shown in FIG. 1 that includes an exemplary fastener clip in accordance with an aspect of the present invention.

FIG. 2 is an exploded view of a portion of the airbag retention assembly 10 shown in FIG. 1 that includes the exemplary fastener clip 12 in accordance with an embodiment of the present invention. The fastener clip 12 includes a body member 102 and a rigid retaining pin 104. In the exemplary embodiment, the body member 102 and the retaining pin 104 are each fabricated from a plastic material as a unitary structure and then separated to form the fastener clip 12 as discussed below. As such, both the body member 102 and the retaining pin 104, and all components included in each, are fabricated as part of a unitary structure to form fastener clip 12. Optionally, the body member 102 and the retaining pin 104 may be fabricated as separate components that are coupled together to form fastener clip 12.

In the exemplary embodiment, the body member 102 has a rectangular cross-sectional profile to enable the fastener clip 12 to be at least partially inserted into the opening 28 in the vehicle chassis 26 and an opening 30 in the trim piece 24 which will be discussed below. It should be realized that the body member 102 may have any shape that enables the fastener clip 12 to be inserted into the opening 28. The body member 102 has a first side 110, a second side 112 disposed approximately parallel to the first side 110. The body member 102 also has a third side 114 and a fourth side 116 that is approximately parallel to the third side 114. Both third and fourth sides 114 and 116 are disposed approximately perpendicular to first and second sides 110 and 112. As such, body member 102 has a substantially rectangular cross-sectional profile having length 118 and a width 120 that is less than the length 118. Moreover, opening 28 is substantially rectangular and has a length 122 and a width 124.

As shown in FIG. 2, the length 118 and width 120 of the body member 102 is slightly less than the length 122 and width 124 of opening 28 to enable the fastener clip 12 to be at least partially inserted into the opening 28 in the vehicle chassis 26. The sides 110, 112, 114, and 116 that form body member 102 also define an opening 130 that extends through the fastener body member 102. The fastener body opening 130 is configured to receive the retaining pin 104 therein. As such, the fastener body opening 130 extends from an upper surface 132 to a lower surface 134 of the body member 102.

Figure 3:
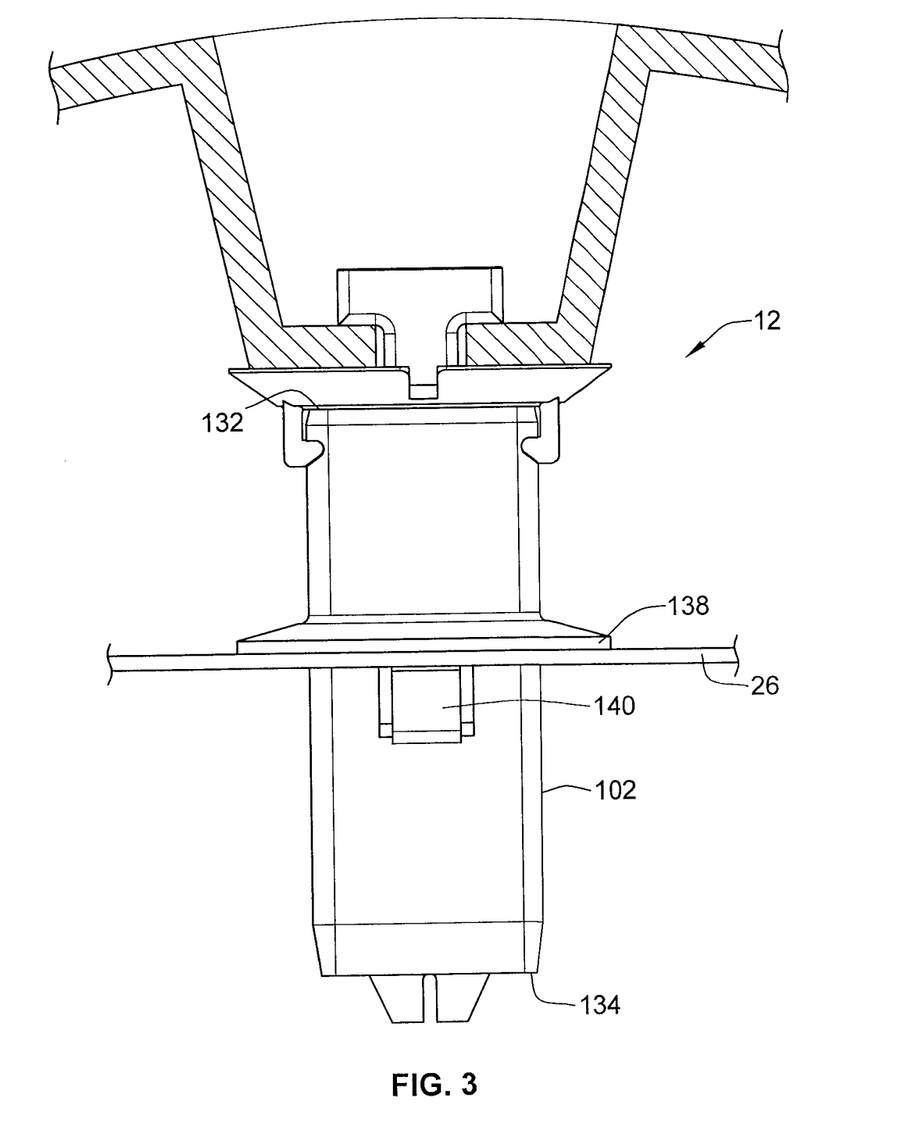
FIG. 3 is a side view of the fastener clip shown in FIG. 2 in accordance with an aspect of the present invention.
Figure 4:
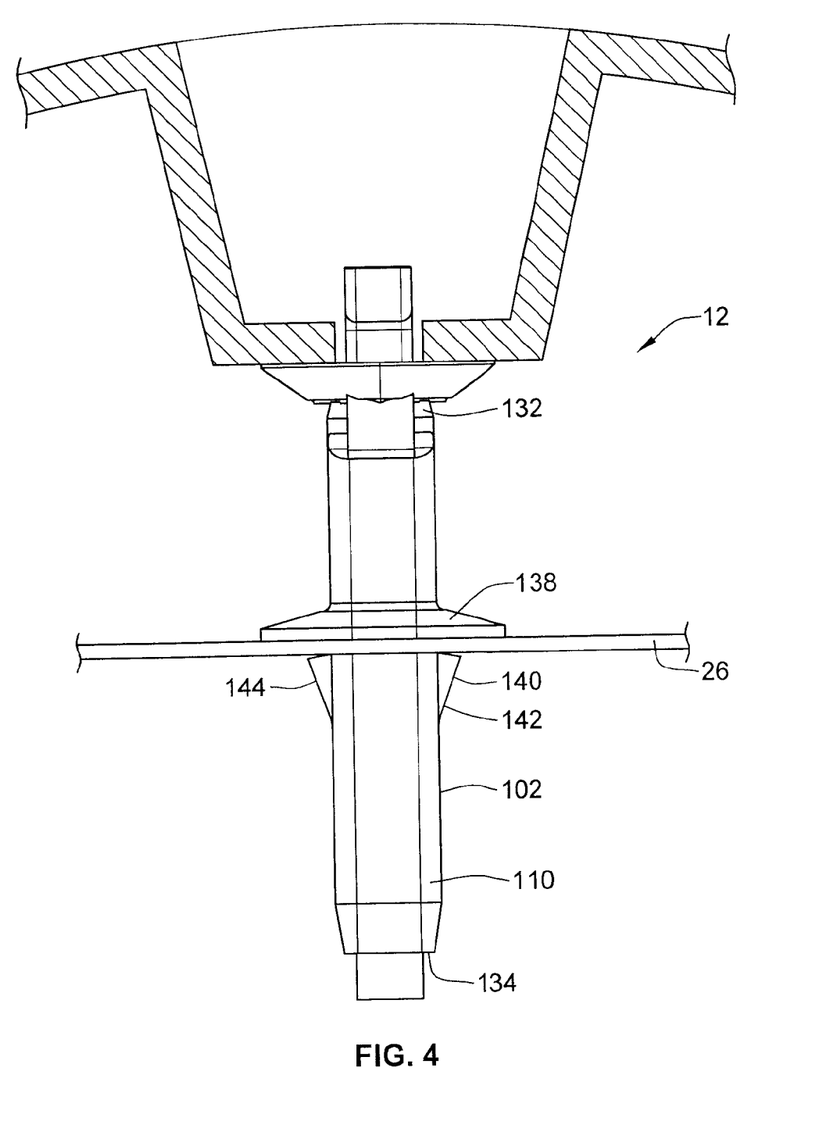
FIG. 4 is another side view of the fastener clip shown in FIG. 2 in accordance with an aspect of the present invention.

FIG. 3 is a side view of the exemplary fastener clip 12 shown in FIG. 2 in accordance with an embodiment of the present invention. FIG. 4 is another side view of the exemplary fastener clip 12 shown in FIG. 2 in accordance with an embodiment of the present invention. As shown in FIGS. 3 and 4, the body member 102 also includes a flexible spring 138 that is disposed approximately midpoint between the upper and lower surfaces 132, 134 of the body member 102. As shown, the flexible spring 138 is concave and has an oval cross-sectional profile, but can be of other suitable shapes and sizes. The flexible spring 138 extends radially outwardly from the body member 102. In use, the flexible spring 138 increases the strength and rigidity of the fastener clip 12 and also functions as a stop device when inserted into the trim piece opening 30. More specifically, since the flexible spring 138 has a dimension that is larger than the size of the opening 28, the larger dimension of the flexible spring 138 limits the travel of the fastener clip 12 when the fastener clip 12 is installed into opening 28 which will be discussed below. Moreover, the flexible spring 138 is configured to deform when the fastener clip 12 is installed into the opening 28. This deformation results in a slight pressure being exerted between the vehicle chassis 26 and the fastener clip 12 to limit movement of the fastener clip 12 when installed in the opening 28. The flexible spring 138 further allows for variations in the thickness of chassis 26.

As shown in FIG. 4, the fastener clip 12 also includes a first pair of flexible retention legs 140 that are formed on the body member 102 between the flexible spring 138 and the lower surface 134. More specifically, the fastener clip 12 includes a first retention leg 142 that is formed in the first side 110 of body member 102 and a second retention leg 144 that is formed in the second side 112 of body member 102. The pair of retention legs 140 each have a triangular shape to enable the fastener clip 12 to be inserted within the opening 28 while also retaining the fastener clip 12 within opening 28. It should be realized that the pair of retention legs 140 may have any shape that enables the fastener clip 12 to be inserted and retained within the opening 28. In use, when pressure is applied to the pair of retention legs 140, the pair of retention legs 140 deform inwardly towards the surface of body member 102 to enable the fastener clip 12 to be inserted into opening 28. After the fastener clip 12 is inserted into opening 28, the pair of retention legs 140 deform outwardly from body member 102, or return to their normal or fully extended state, to enable the fastener clip 12 to be retained within opening 28.

Figures 5A, 5B:
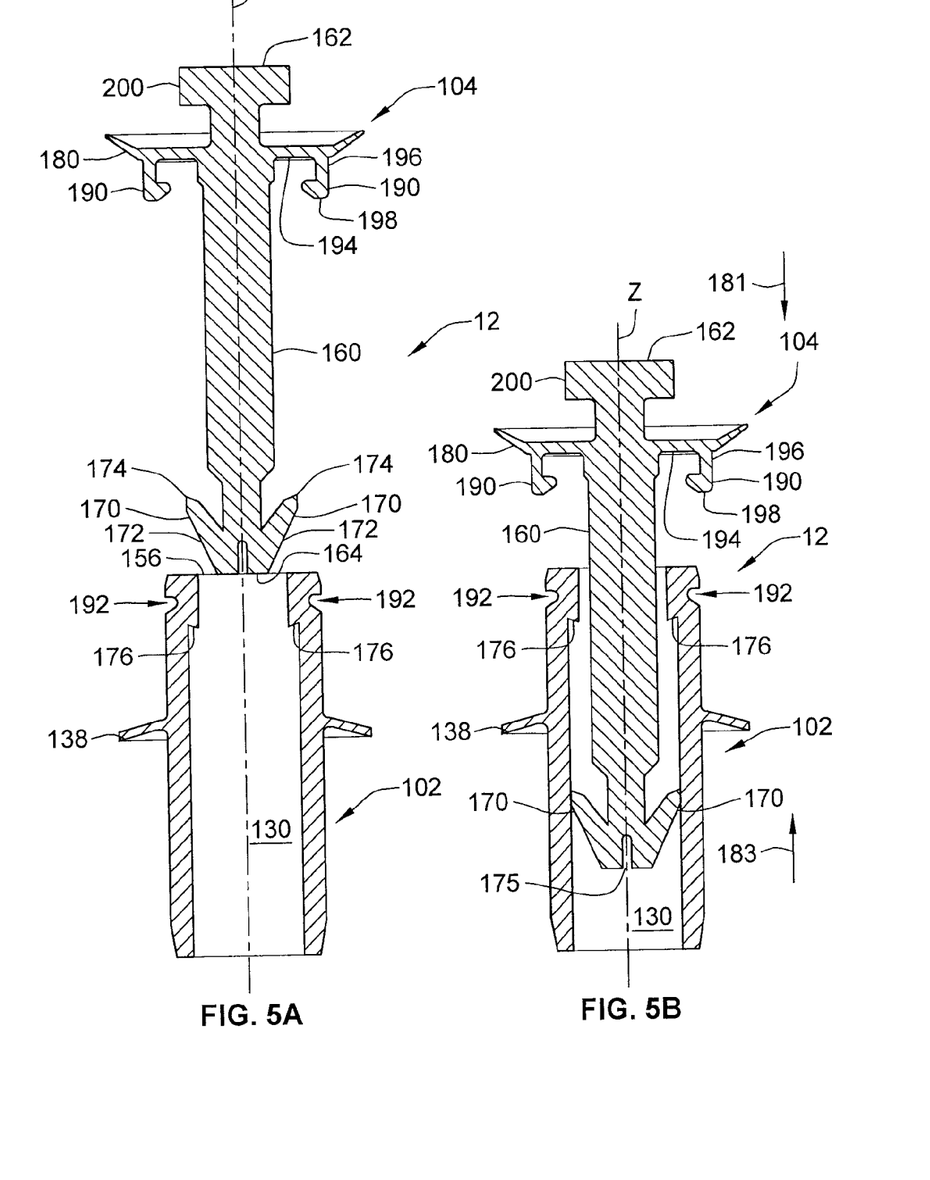
FIGS. 5A and 5B are side section views of the exemplary fastener clip shown in FIG. 2 in a molding position and assembled position in accordance with an embodiment of the invention.

FIG. 5A is a side section view of the exemplary fastener clip 12 shown in FIG. 2 after the completion of the molding process and FIG. 5B is a side section view of the fastener clip 12 in the assembled position in accordance with an embodiment of the invention. As discussed above, the fastener clip 12 is fabricated from a plastic material as a unitary structure, as such, both the body member 102 and the retaining pin 104, and all components included in each, are fabricated as part of the unitary structure of fastener clip 12.

In the molding position, the body member 102 is aligned with the retaining pin 104 along a common axis, shown in FIGS. 5A and 5B as the Z-axis. During the molding process, common molding gates are formed at an intersection between the body member 102 and the retaining pin 104. This initially results in vestiges 156 being formed at the intersection between the body member 102 and the retaining pin 104. After the molding process is completed, the molding gates or vestiges 156 are broken by moving the retaining pin 104 along the Z-axis with respect to the body member 102. Specifically, the retaining pin 104 is forced into the fastener body opening 130.

As shown in FIGS. 5A and 5B, the retaining pin 104 includes a rectangular body 160 having a first end 162 and a second end 164. The retaining pin body 160 is substantially rectangular to enable the retaining pin 104 to be inserted into the rectangular fastener body opening 130. During operation, the rectangular shape of both the fastener body opening 130 and the retaining pin body 160 substantially limit the rotational movement of the retaining pin 104 with respect to the body member 102. Thus the retaining pin 104 is configured to move only along a Z-axis as shown in FIG. 4.

The retaining pin 104 also includes a pair of catch members 170 that are disposed proximate to the retaining pin second end 164. In the exemplary embodiment, the combination of the retaining pin second end 164 and the catch members 170 form a substantially arrow-shaped member. The catch members 170 each have a first end 172 that is formed unitarily with the retaining pin second end 164 and a second end 174 that extends outwardly from the retaining pin body 160. In operation, a gap 175 enables the catch members 170 to flex inwardly towards each other or outwardly away from each other to enable the retaining pin 104 to be inserted into the fastener body opening 130 while also securing the retaining pin 104 within the body member 102.

For example, after the molding process is completed, a portion of the retaining pin 104 that includes the pair of catch members 170, is forced through the fastener body opening 130 until the pair of catch members 170 are positioned past a pair of stops 176. The pair of stops 176 then prohibit the retaining pin 104 from being removed from the body member 102 after the retaining pin 104 has been inserted therein. The catch members 170 deform inwardly towards body member 102 to enable the retaining pin 104 to be inserted into the body member 102. After the retaining pin 104 is inserted into the body member 102, the pair of catch members 170 pass by the pair of stops 176 such that the pair of stops 176 substantially prohibit the retaining pin 104 from being removed from the body member 102. Moreover, the pair of stops 176 substantially limit the movement of the retaining pin 104 when the airbag 20 is deployed as discussed below. Upon deployment of the airbag 20, the retaining pin 104 slides outwardly from the retaining pin body 160 and catches the pair of stops 176 formed on an inner surface of the body member 102.

The retaining pin 104 also has a flexible spring 180 that is formed between the catch members 170 and the retaining pin first end 162. As shown in FIG. 2, the flexible spring 180 is concave and has a circular cross-sectional profile. The flexible spring 180 extends radially outwardly from the retaining pin 104. In use, the flexible spring 180 increases the strength and rigidity of the retaining pin 104 and also functions to exert a force on the trim piece 24 to substantially limit the movement of the trim piece 24 with respect to the vehicle chassis 26 when the airbag 20 is in the stowed or non-deployed position. As shown in FIGS. 5A and 5B, in the exemplary embodiment, the flexible spring 180 exerts a force in a first direction 181 that is opposite to a direction of force that extends in a second direction 183 that is exerted by the spring 138. Moreover, the flexible spring 180 is configured to deform when the trim piece 24 is coupled to the fastener clip 12. This deformation results in a slight pressure being exerted between the vehicle chassis 26 and the trim piece 24 when the airbag 20 is in the stowed position.

As shown in FIGS. 5A and 5B, the flexible spring 180 also includes a pair of flexible fingers 190 that are configured to engage a pair of detents 192 that are configured to receive the pair of flexible fingers 190. In the exemplary embodiment, the pair of flexible fingers 190 extend from a lower surface 194 of the flexible spring 180. Each finger 190 includes a first end 196 that is coupled to and formed unitarily with the flexible spring 180 and a second end 198 that extends radially inward to enable each finger 190 to engage a respective detent 192. Alternatively, fingers 190 can be similarly positioned on body member 102 and detents 192 can be similarly located on the retaining pin 104.

The retaining pin 104 also includes a trim stop 200 that is disposed on the retaining pin first end 162. In the exemplary embodiment, the trim stop 200 is substantially rectangular to enable the trim stop 200 to be inserted through the trim piece opening 30 during installation.

In the exemplary embodiment, the trim stop 200 is positioned a predetermined distance from the catch member second ends 174. For example, assuming that it is desired that the trim piece 24 separate from the vehicle chassis 26 by approximately one inch when the airbag 20 is deployed, the trim stop 200 is positioned approximately one inch from the catch member second ends 174. To increase the distance that the trim piece 24 separates from the chassis 26, the length of the retaining pin body 160 may be increased such that the trim stop 200 is separated from the catch member second ends 174 by an increased distance. Optionally, to decrease the distance that the trim piece 24 separates from the chassis 26, the length of the retaining pin body 160 may be reduced such that the trim stop 200 is separated from the catch member second ends 174 by a reduced distance.

Figure 6A:
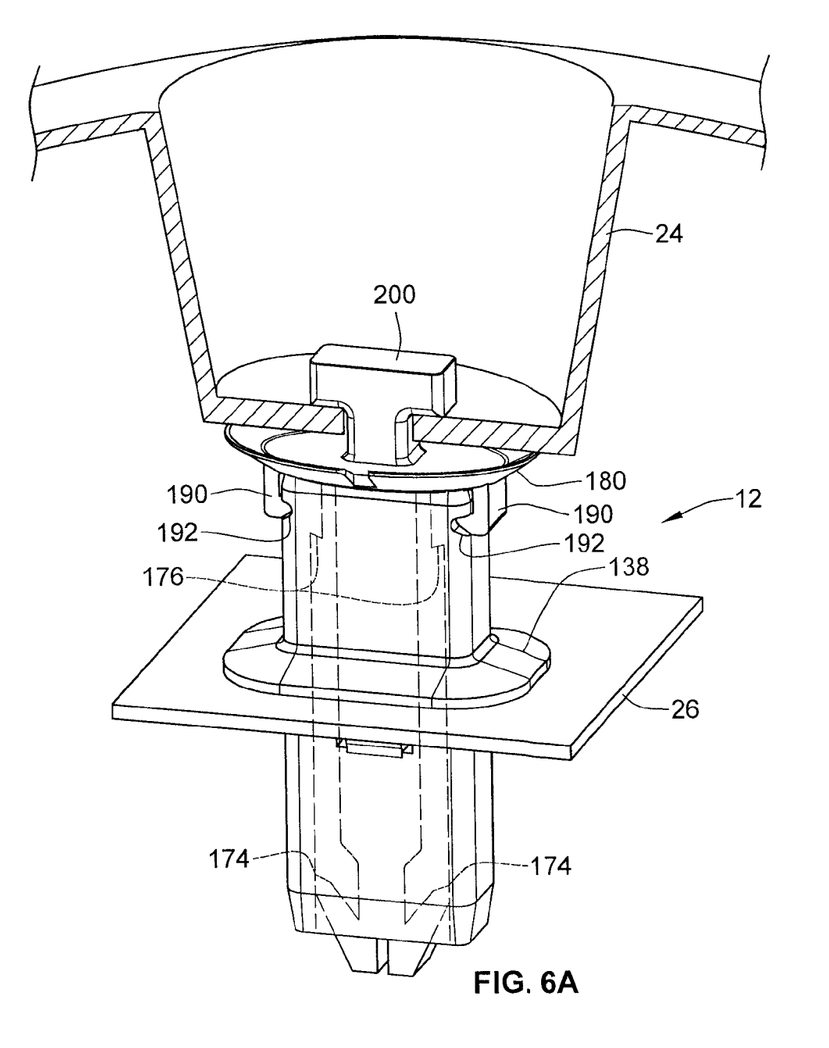
FIGS. 6A and 6B are perspective views of the fastener clip shown in FIG. 2 in a stowed position and a deployed position in accordance with an aspect of the present invention.
Figure 6B:
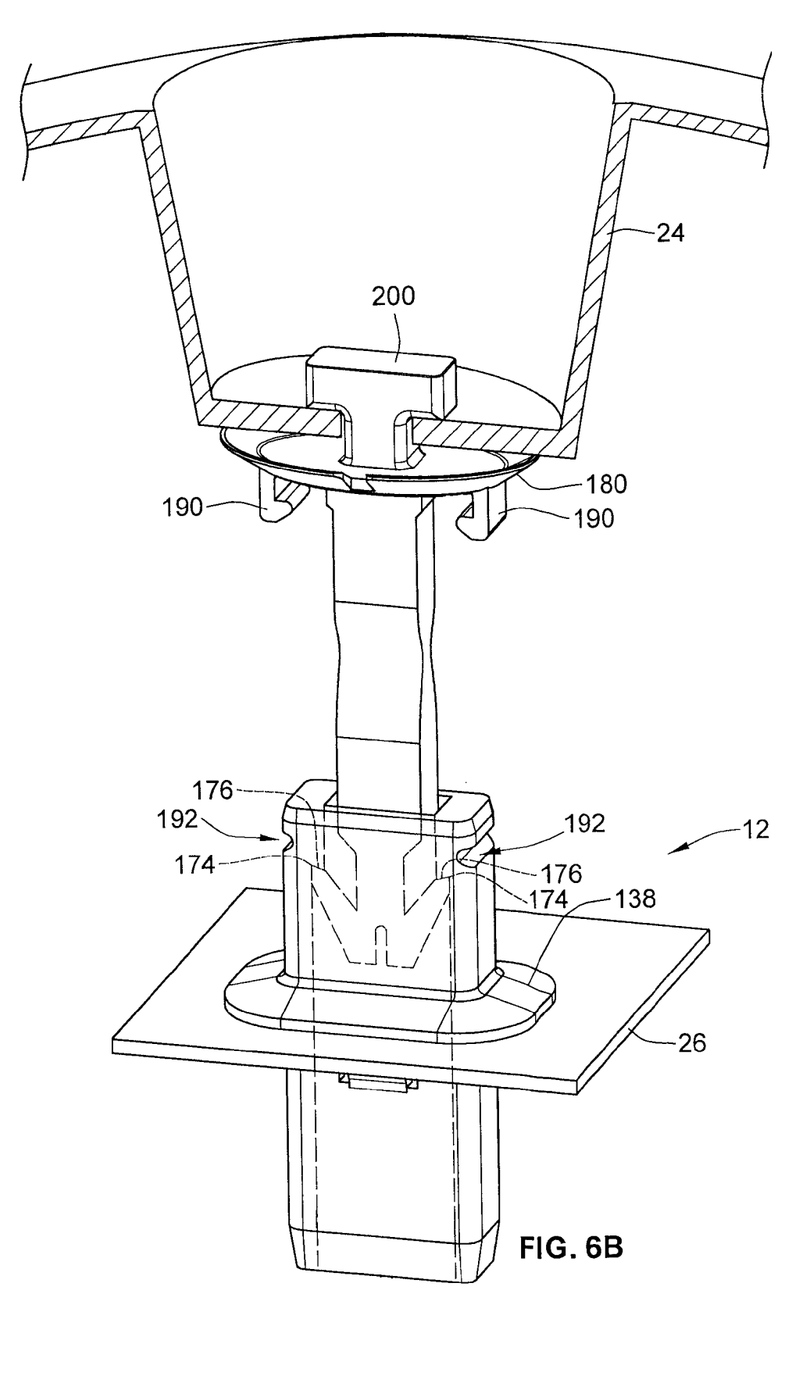

FIG. 6A illustrates the fastener clip 12 in a non-deployed or standby position. FIG. 6B illustrates the fastener clip 12 in a deployed position. As shown in FIG. 6A, in the standby position, the retaining pin 104 is fully inserted into the fastener body opening 130. More specifically, the retaining pin 104 is inserted into the fastener body opening 130 until the flexible spring 180 is at least partially compressed and the pair of flexible fingers 190 are each engaged with a detent 192. As shown in FIG. 6B, when the airbag 20 is deployed, i.e. a predetermined force is applied to the trim piece 24, the trim piece 24 moves away from the vehicle chassis 26. More specifically, the force of the inflated airbag 20 is sufficient to overcome the coupling force between the flexible fingers 190 and the detents thus uncoupling the flexible fingers 190 from the detents 192. As shown in FIG. 6B, force of the inflated airbag 20 causes the trim piece 24 to move away from the vehicle chassis 26 until the pair of catch members 170 make contact with the pair of stops 176. The pair of stops 176 then prohibit the retaining pin 104, and thus the trim piece 24 from moving further from the chassis 26. As a result, the retaining pin 104 prevents the trim piece 24 from moving a distance from the vehicle chassis 26 that is greater than the predefined distance as discussed above.

Described herein is a fastener clip that is utilized to secure a trim piece to a vehicle chassis when the airbag is deployed. The fastener clip includes a body fixedly coupled to a vehicle chassis and having an opening extending therethrough. In one embodiment, the opening is rectangular to receive a rectangular fastener clip body. Optionally, the opening is circular to receive a cylindrically shaped body. A rigid retaining pin is inserted through an opening in the fastener clip body. The rigid retaining pin includes at least one flexible finger that is configured to engage at least one detent formed in the body of the fastener clip. When the airbag is deployed, the force of the inflated airbag is sufficient to overcome the coupling force between the flexible fingers and the detents. Specifically, the force of the airbag being inflated is greater than the coupling force between the flexible fingers and the detents. The rigid retaining pin also includes an integral trim stop that limits the movement of a vehicle trim piece with respect to the vehicle chassis when the airbag is deployed.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener clip for an airbag retention system having an airbag, said fastener clip comprising:
    a tubular body having an opening extending therethrough and an exterior surface, wherein the tubular body has a rectangular cross-sectional profile;
    a rigid retaining pin inserted through the opening, wherein the rigid retaining pin is configured to slide with respect to the tubular body;
    at least one detent being formed in one of the exterior surface of the body and the rigid retaining pin, and the other of the exterior surface of the body and the rigid retaining pin having at least one flexible finger which is configured to engage the at least one detent as well as disengage from the at least one detent when the airbag is deployed;
    a concave spring adapted to limit the movement of the trim piece when the airbag is in a stowed position, the at least one flexible finger coupled to the concave spring; and
    a pair of catch members, the pair of catch members are deformable to enable the rigid retaining pin to be inserted through the opening in the body.

2. A fastener clip in accordance with claim 1 wherein the at least one flexible finger is configured to engage the at least one detent when the airbag is in a standby position to limit the movement of a vehicle trim piece with respect to a vehicle chassis when the airbag is in the standby condition.

3. A fastener clip in accordance with claim 1 wherein the at least one detent includes a pair of detents formed on opposite sides of the body.

4. A fastener clip in accordance with claim 1 wherein the body comprises a pair of flexible retention legs adapted to secure the fastener clip to a vehicle chassis.

5. A fastener clip in accordance with claim 1 wherein the at least one flexible finger is adapted to secure a trim piece to a vehicle chassis.

6. A fastener clip in accordance with claim 1, wherein the rigid retaining pin further comprises a rectangular trim stop adapted to limit the movement of the trim piece when the airbag is deployed.

7. A fastener clip in accordance with claim 1, wherein the trim piece has a rectangular opening and the rigid retaining pin further comprises a rectangular trim stop adapted to extend through the rectangular opening and retain the trim piece when the airbag is deployed.

8. A fastener clip in accordance with claim 1 wherein the body further comprises a pair of stops adapted to engage the pair of catch members to limit the movement of the rigid retaining pin after the airbag has been deployed.

9. A side airbag retention system for use in conjunction with a vehicle including a vehicle chassis, an airbag coupled to the vehicle chassis, and a trim piece adapted to cover the airbag, said airbag retention system comprising:
    a fastener clip comprising
        a tubular body having an opening extending therethrough, wherein the tubular body has a rectangular cross-sectional profile
        a pair of detents formed in an exterior surface of the body; and
        a rigid retaining pin inserted through the opening, the rigid retaining pin having (a) a pair of flexible fingers configured to engage the pair of detents, the flexible fingers configured to disengage from the pair of detents when an airbag is deployed, (b) a concave spring adapted to limit the movement of the trim piece when the airbag is in a stowed position, the at least one flexible finger coupled to the concave spring; and (c) a pair of catch members, the pair of catch members are deformable to enable the rigid retaining pin to be inserted through the opening in the body.

10. An airbag retention system in accordance with claim 9, wherein the flexible fingers are configured to engage the pair of detents when the airbag is in a standby position.

11. An airbag retention system in accordance with claim 9, wherein the body comprises a pair of flexible retention legs adapted to secure the fastener clip to the vehicle chassis.

12. An airbag retention system in accordance with claim 9, wherein the rigid retaining pin further comprises a rectangular trim stop adapted to limit the movement of the trim piece when the airbag is deployed.

13. An airbag retention system in accordance with claim 9, wherein the trim piece has a rectangular opening and the rigid retaining pin further comprises a rectangular trim stop adapted to extend through the rectangular opening and retain the trim piece when the airbag is deployed.

14. An airbag retention system in accordance with claim 9, wherein the body further comprises a pair of stops adapted to engage the pair of catch members to limit the movement of the rigid retaining pin after the airbag has been deployed.

* * * * *